US012712169B2

(12) United States Patent
Holden et al.

(10) Patent No.: US 12,712,169 B2
(45) Date of Patent: Aug. 18, 2026

(54) MAGNET POSITIONING SYSTEM FOR ION SOURCE

(71) Applicant: Thermo Finnigan LLC, San Jose, CA (US)

(72) Inventors: Dustin D. Holden, Round Rock, TX (US); Nicholas A. Pedrazas, Austin, TX (US)

(73) Assignee: Thermo Finnigan LLC, San Jose, CA (US)

( * ) Notice: Subject to any disclaimer, the term of this patent is extended or adjusted under 35 U.S.C. 154(b) by 664 days.

(21) Appl. No.: 18/251,853

(22) PCT Filed: Nov. 19, 2021

(86) PCT No.: PCT/US2021/060083
§ 371 (c)(1),
(2) Date: May 4, 2023

(87) PCT Pub. No.: WO2022/109265
PCT Pub. Date: May 27, 2022

(65) Prior Publication Data

US 2023/0411135 A1 Dec. 21, 2023

Related U.S. Application Data

(60) Provisional application No. 63/170,031, filed on Apr. 2, 2021, provisional application No. 63/116,075, filed on Nov. 19, 2020.

(51) Int. Cl.
*H01J 49/10* (2006.01)
*H01J 49/08* (2006.01)

(52) U.S. Cl.
CPC .............. *H01J 49/10* (2013.01); *H01J 49/08* (2013.01)

(58) Field of Classification Search
CPC .......... H01J 49/10; H01J 49/08; H01J 49/145; H01J 49/147
(Continued)

(56) References Cited

U.S. PATENT DOCUMENTS 3,277,295 A 10/1966 Briggs
8,334,517 B2 12/2012 Jen et al.
(Continued)

FOREIGN PATENT DOCUMENTS

CN 110137071 B 2/2021

OTHER PUBLICATIONS

Thermo Scientific, ISQ 7000 Mass Spectrometers Hardware Manual, Dec. 2018 (Year: 2018).*
(Continued)

*Primary Examiner* — Michael Maskell

(57) ABSTRACT

A mass spectrometer includes an ionization assembly including an ionization chamber and at least one ion lens. The removable ionization assembly has a primary axis defined by the direction of an ion beam exiting the ionization assembly, and the ionization chamber and the at least one ion lens arranged along the primary axis. The mass spectrometer further includes an electron source aligned along the primary axis of the ionization assembly and a magnet assembly including a magnet. The electron source configured to provide an electron beam parallel to the primary axis. The magnet assembly movable between a first position in which the magnet is positioned to allow removal of the ion source and a second position in which the magnet is aligned with the electron source.

20 Claims, 10 Drawing Sheets

(58) Field of Classification Search
USPC ..................................... 250/288, 289, 423 R
See application file for complete search history.

(56) References Cited

U.S. PATENT DOCUMENTS

| | | | |
|---|---|---|---|
| 9,721,777 | B1 | 8/2017 | Muntean |
| 10,490,396 | B1 | 11/2019 | McCauley et al. |
| 2019/0333747 | A1 | 10/2019 | Christian |

OTHER PUBLICATIONS

Anonymous: "ISO 7000 Mass Spectrometers Hardware Manual", Dec. 1, 2018, Retrieved from the Internet: URL: https://s3-us-west-2.amazonaws.com/freshwebmaterial/ User+Documentation/ISO+ Series+Manuals/ISO7000/1R120617-0002+(Rev.+C) +ISO+ 7000+ Hardware+ Manual .pdf [retrieved on Feb. 17, 2022] XP55893029.
Diaz et al. "Sub-Miniature ExB Sector-Field Mass Spectrometer" Journal of the American Society for Mass Spectrometry, Jun. 2001, vol. 12, No. 6, pp. 619-632.
Bunert et al., "Ion mobility spectrometer with orthogonal X-Ray source for increased sensitivity," Talanta, Aug. 1, 2018, vol. 185, pp. 537-541.
PCT/US2021/060083, International Search Report and Written Opinion, Feb. 28, 2022, 13 pages.

* cited by examiner

MAGNET POSITIONING SYSTEM FOR ION SOURCE

RELATED APPLICATIONS

This application is a national stage filing under 35 U.S.C. § 371 of PCT International application PCT/US2021/060064 filed Nov. 19, 2021, which claims priority to both provisional patent applications U.S. 63/116,075, filed on Nov. 19, 2020 and 63/170,031, filed on Apr. 2, 2021. Each application named in this section is incorporated by reference herein, each in its entirety.

FIELD

The present disclosure generally relates to the field of mass spectrometry including a magnet positioning system for an ion source.

INTRODUCTION

Mass spectrometry can be used to perform detailed analyses on samples. Furthermore, mass spectrometry can provide both qualitative (is compound X present in the sample) and quantitative (how much of compound X is present in the sample) data for a large number of compounds in a sample. These capabilities have been used for a wide variety of analyses, such as to test for drug use, determine pesticide residues in food, monitor water quality, and the like.

Ionization of the sample for mass spectrometry requires an ion source, such as an electron impact ionization (EI) source or chemical ionization (CI) source. In some instances, a single source can switch between an EI mode and CI mode. While the source may operate for many experiments without maintenance, periodic maintenance of the source may be necessary. This can include cleaning of deposits left behind by the ionization process that build up over time or the replacement of consumable components, such as an electron source filament. Additionally, it can be desirable to avoid venting the mass spectrometer when performing maintenance of the ion source, as it can take several hours to reestablish the vacuum pressures necessary for operation of the mass spectrometer from near atmospheric pressures. From the foregoing it will be appreciated that a need exists for improved ion sources.

SUMMARY

A mass spectrometer can include an ionization assembly including an ionization chamber and at least one ion lens. The removable ionization assembly can have a primary axis defined by the direction of an ion beam exiting the ionization assembly, and the ionization chamber and the at least one ion lens can be arranged along the primary axis. The mass spectrometer can further include an electron source aligned along the primary axis of the ionization assembly and a magnet assembly including a magnet. The electron source can be configured to provide an electron beam parallel to the primary axis. The magnet assembly can be movable between a first position in which the magnet is positioned to allow removal of the ion source and a second position in which the magnet is aligned with the electron source. Fine tuning of the magnet position relative to the electron source, for purposes of optimization, is also feasible making the second position adjustable.

DRAWINGS

For a more complete understanding of the principles disclosed herein, and the advantages thereof, reference is now made to the following descriptions taken in conjunction with the accompanying drawings, in which.

Figure 1:
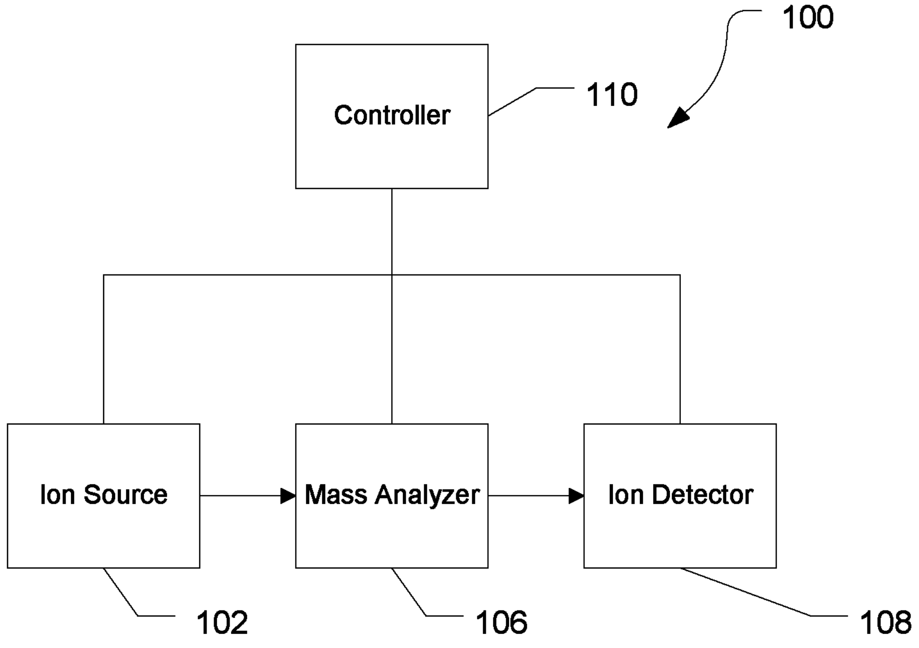
FIG. 1 is a block diagram of an exemplary mass spectrometry system, in accordance with various embodiments.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DESCRIPTION OF VARIOUS EMBODIMENTS

Embodiments of a magnet positioning system for an ion source are described herein.

The section headings used herein are for organizational purposes only and are not to be construed as limiting the described subject matter in any way.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless described otherwise, all technical and scientific terms used herein have a meaning as is commonly understood by one of ordinary skill in the art to which the various embodiments described herein belongs.

It will be appreciated that there is an implied "about" prior to the temperatures, concentrations, times, pressures, flow rates, cross-sectional areas, etc. discussed in the present teachings, such that slight and insubstantial deviations are within the scope of the present teachings. In this application, the use of the singular includes the plural unless specifically stated otherwise. Also, the use of "comprise", "comprises", "comprising", "contain", "contains", "containing", "include", "includes", and "including" are not intended to be limiting. It is to be understood that both the foregoing general description and the following detailed description are exemplary and explanatory only and are not restrictive of the present teachings.

As used herein, "a" or "an" also may refer to "at least one" or "one or more." Also, the use of "or" is inclusive, such that the phrase "A or B" is true when "A" is true, "B" is true, or both "A" and "B" are true. Further, unless otherwise required by context, singular terms shall include pluralities and plural terms shall include the singular.

A "system" sets forth a set of components, real or abstract, comprising a whole where each component interacts with or is related to at least one other component within the whole.

Mass Spectrometry Platforms

Various embodiments of mass spectrometry platform 100 can include components as displayed in the block diagram of FIG. 1. In various embodiments, elements of FIG. 1 can be incorporated into mass spectrometry platform 100. According to various embodiments, mass spectrometer 100 can include an ion source 102, a mass analyzer 106, an ion detector 108, and a controller 110.

In various embodiments, the ion source 102 generates a plurality of ions from a sample. The ion source can include, but is not limited to, an electron ionization (EI) source, a chemical ionization (CI) source, and the like.

In various embodiments, the mass analyzer 106 can separate ions based on a mass-to-charge ratio of the ions. For example, the mass analyzer 106 can include a quadrupole mass filter analyzer, a quadrupole ion trap analyzer, a time-of-flight (TOF) analyzer, an electrostatic trap (e.g., Orbitrap) mass analyzer, Fourier transform ion cyclotron resonance (FT-ICR) mass analyzer, and the like. In various embodiments, the mass analyzer 106 can also be configured to fragment the ions using collision induced dissociation (CID) electron transfer dissociation (ETD), electron capture dissociation (ECD), photo induced dissociation (PID), surface induced dissociation (SID), and the like, and further separate the fragmented ions based on the mass-to-charge ratio. In various embodiments, the mass analyzer 106 can be a hybrid system incorporating one or more mass analyzers and mass separators coupled by various combinations of ion optics and storage devices. For example, a hybrid system can a linear ion trap (LIT), a high energy collision dissociation device (HCD), an ion transport system, and a TOF.

In various embodiments, the ion detector 108 can detect ions. For example, the ion detector 108 can include an electron multiplier, a Faraday cup, and the like. Ions leaving the mass analyzer can be detected by the ion detector. In various embodiments, the ion detector can be quantitative, such that an accurate count of the ions can be determined. In various embodiments, such as with an electrostatic trap mass analyzer, the mass analyzer detects the ions, combining the properties of both the mass analyzer 106 and the ion detector 108 into one device.

In various embodiments, the controller 110 can communicate with the ion source 102, the mass analyzer 106, and the ion detector 108. For example, the controller 110 can configure the ion source 102 or enable/disable the ion source 102. Additionally, the controller 110 can configure the mass analyzer 106 to select a particular mass range to detect. Further, the controller 110 can adjust the sensitivity of the ion detector 108, such as by adjusting the gain. Additionally, the controller 110 can adjust the polarity of the ion detector 108 based on the polarity of the ions being detected. For example, the ion detector 108 can be configured to detect positive ions or be configured to detected negative ions.

Ion Source

Figure 2:
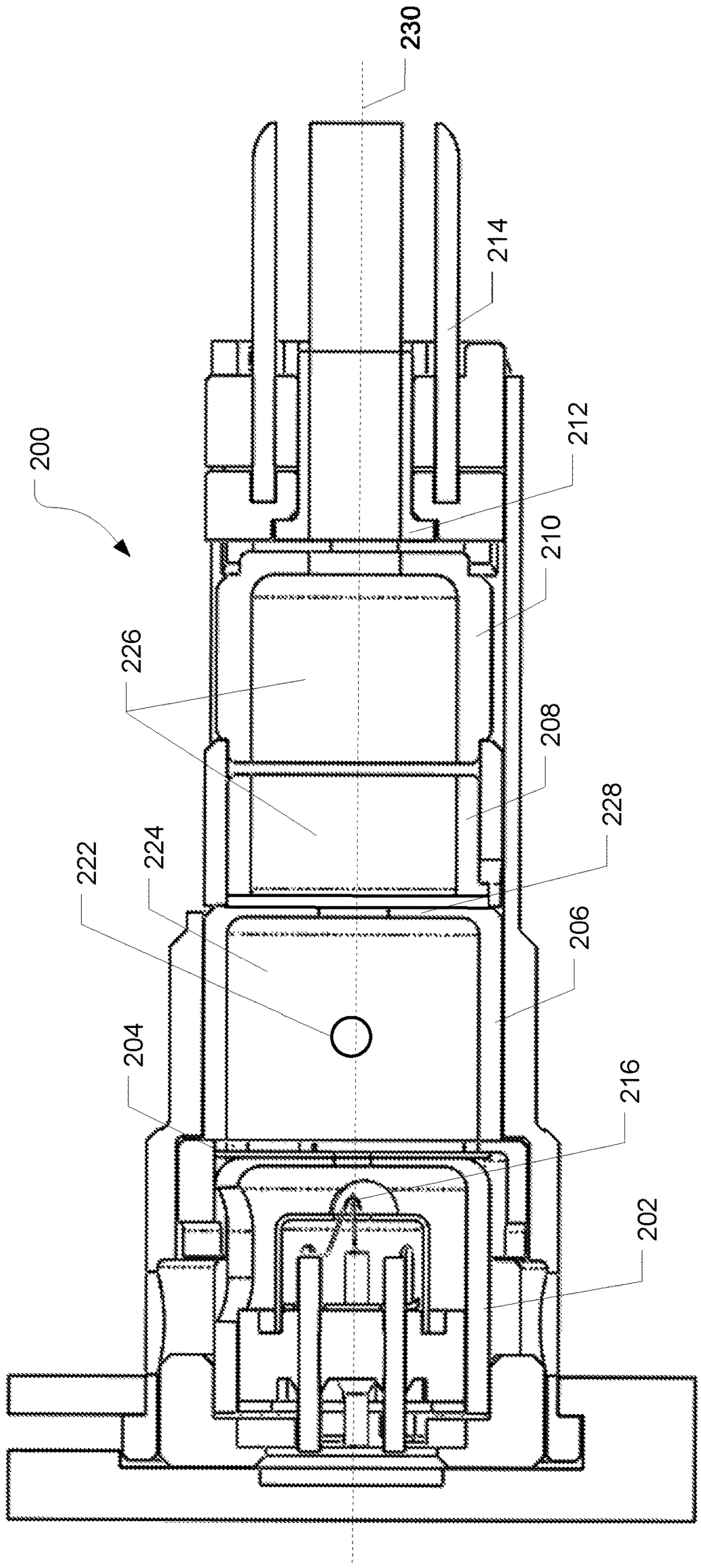
FIG. 2 is a diagram of an ion source, in accordance with various embodiments.

FIG. 2 is a diagram illustrating an ion source 200, which can be used as ion source 102 of mass spectrometry platform 100. Ion source 200 can include a first electron source 202, an electron lens 204, an ionization chamber 206, lens elements 208, 210, and 212, and RF ion guide 214. Ion source 200 can include an axis 230 along which ions are directed out of the ionization chamber to other components of the mass spectrometer.

Electron source 202 can include a thermionic filament 216 for the generation of electrons. In various embodiments, electron source 202 can include additional thermionic filaments for redundancy or increased electron production. In alternate embodiments, electron source 202 can include a field emitter. The electrons from electron source 202 can travel along axis 230 into ionization chamber 206 of ion source 200 to ionize gas molecules. Electron lens 204 can serve to prevent the ions from traveling back towards the electron source.

Ionization chamber 206 can include gas inlet 222 for directing a gas sample into an ionization volume 224 defined by the ionization chamber 208. Gas molecules within the ionization volume 224 can be ionized by the electrons from the thermionic filament 216. Lenses 208 and 210 can define a post ionization volume 226. Post ionization volume 226 can be a region where ions can be formed which has a lower pressure for the sample. Post ionization volume 226 can include regions of the lenses where electrons are present. In various embodiments, it may also include areas outside of the ionization volume and the lenses. Wall 228 can restrict the flow of gas from ionization volume 224 to the post ionization volume 226, creating a substantial pressure difference between the ionization volume 224 and post ionization volume 226. While ionization can occur in post ionization volume 226, significantly more ions can be generated in ionization volume 224 due to the lower sample density in the post ionization volume 226.

Lens 208 and 210 and RF ion guide 214 can assist in the movement of ions along axis 230 from the ionization volume 224 to additional ion optical elements which direct the ions to mass analyzer 106 of mass spectrometry platform 100.

Ionizing analytes utilizing a stream of electrons in the ion source 200 can benefit from the employment of a magnetic field provided by permanent or electromagnets to control and locate the stream of electrons within ion source 200. Furthermore, operating an ion source 200 to ionize analyte molecules along axis 230 requires a magnetic field that also traverses axis 230, which entrains the ionizing electron beam. Among numerous ways magnets may be arranged for ion source 200, one or more magnets may be placed at the opposite end of which analyte ions would exit the ion source 200. In various embodiments, a magnet positioning system, as described below, can position a magnet assembly, including one or more magnets, to entrain electrons along axis 230. The position of the magnet assembly can be adjusted to precisely control the positioning of the one or more magnets, allowing optimization of the magnetic field alignment with the axis 230 without venting the vacuum chamber. In various embodiments, the optimum magnet position may be slight off axis or not perfectly aligned with the ion beam axis. In other embodiments, if may be desirable to intentionally move the magnet position off axis, such as to gate the electron beam or use the electron beam to clean an interior surface of the ion source. In various embodiments, controller 110 may control the position of the magnet assembly. In other embodiments, the position of the magnet assembly can be manually adjusted. The magnet positioning system can also position the magnet assembly off axis from axis 230 for purposes of moving the ionizing electron beam off axis from axis 230. This function may be used for processes such as electron beam cleaning of parts, or controlling, or gating, ionization of analyte molecules, or ion signal.

Additionally, the positioning of the magnet assembly may impede the removal of the ion source. However, removing the magnet with the ion source can present additional safety concerns. In various embodiments, the magnets can be moved to a position displaced from axis 230 to allow the removal of the ion source 200. The ion source 200 may need to be removed periodically for cleaning or other routine maintenance, such as replacing the electron source 202. The ability to adjust the magnet positioning and/or remove the ion source 200 without venting can significantly reduce down time.

Figure 3A:
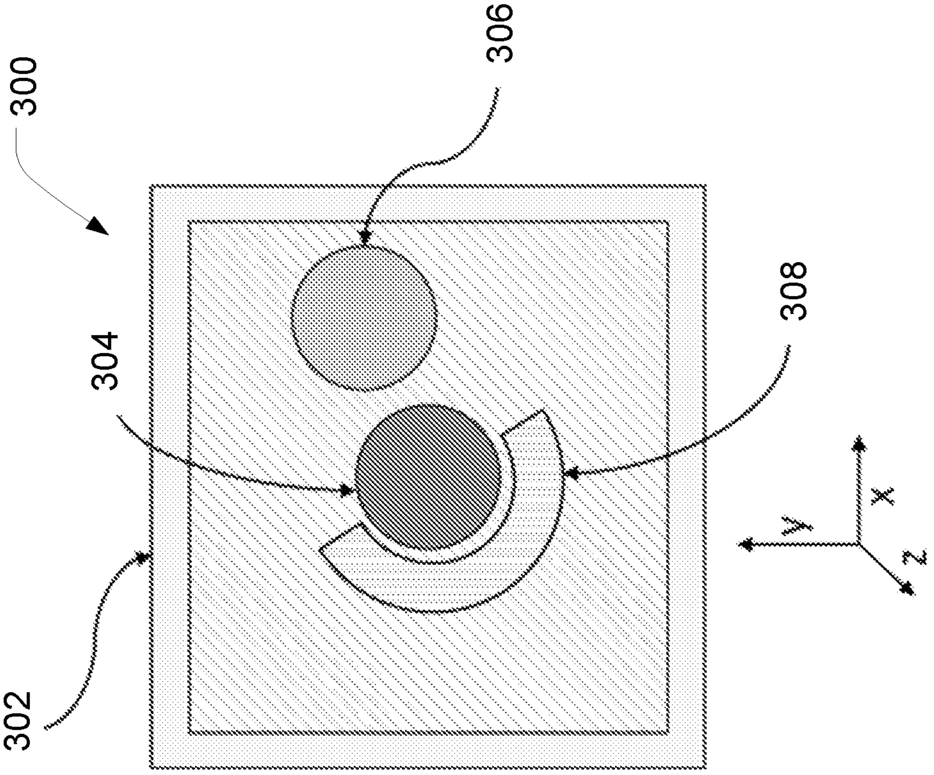
FIGS. 3A and 3B illustrate the operation of an exemplary magnet assembly in conjunction with the ion source, in accordance with various embodiments.
Figure 3B:
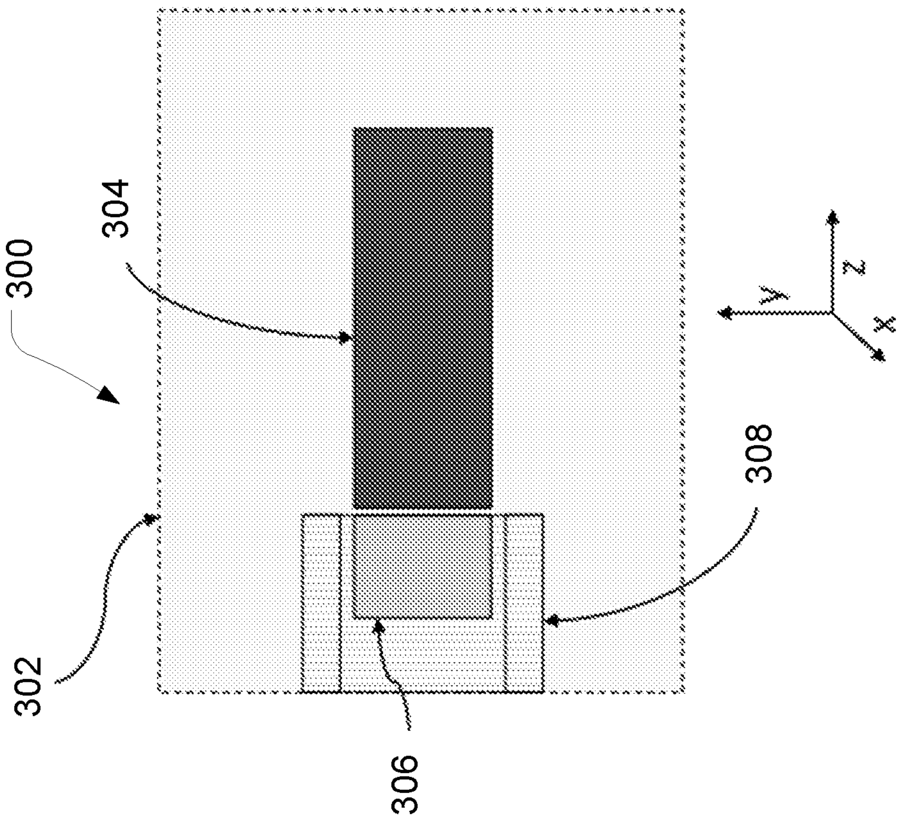

FIGS. 3A and 3B illustrate a mass spectrometer 300. The mass spectrometer 300 can include a vacuum chamber housing 302, an ion source 304, and associated hardware components. The mass spectrometer 300 may further include a magnet positioning system to mount a magnet assembly 306. The magnet assembly 306 can include one or more magnets or electromagnets. The magnet assembly 306 may be mounted directly to the vacuum chamber and located either external and/or internal to the vacuum chamber. In various embodiments, magnet mounting hardware 308 can be in contact with the vacuum chamber and can provide a path of thermal conductance (heatsink) from a magnet to the vacuum chamber. In various embodiments, if the mounting hardware is not adequately thermally conductive, a thermal conductive path may be made through a conductive strap, wire, or a device connected to or contacting magnets and the vacuum housing and/or a designated heatsink. In various embodiments, the vacuum housing may also act as a heat-sink by dissipating heat through convection with the ambient atmosphere.

Figure 4B:
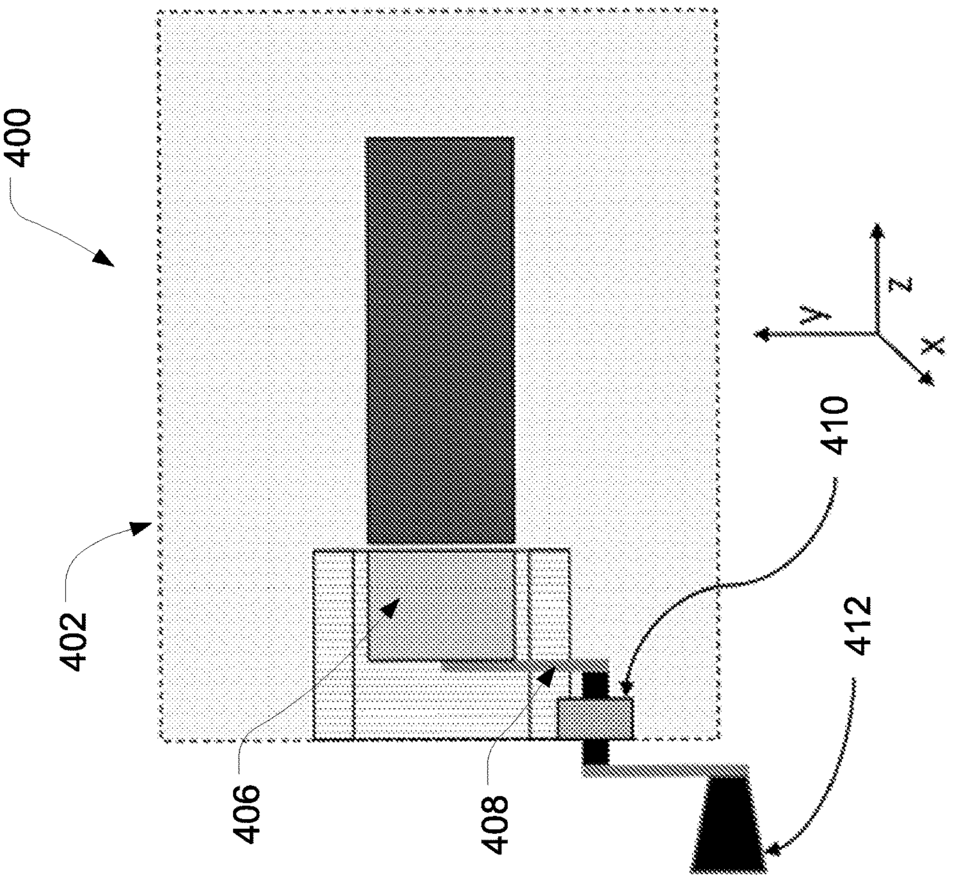
FIGS. 4A and 4B illustrate the operation of another exemplary magnet assembly in conjunction with the ion source, in accordance with various embodiments.
Figure 4A:
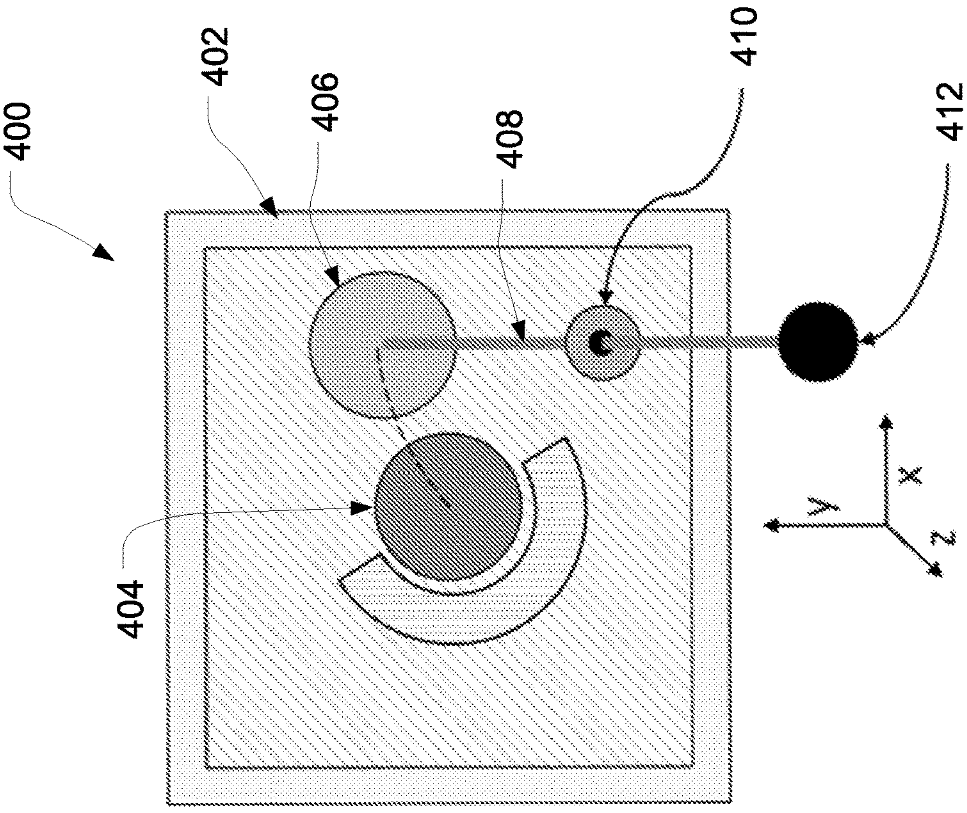

FIGS. 4A and 4B illustrate a mass spectrometer 400. The mass spectrometer 400 can include a vacuum chamber housing 402, an ion source 404, and associated hardware components. The mass spectrometer 400 may further include a magnet positioning system to mount one or more magnets or electromagnets 406. The one or more magnets or electromagnets 406 may be mounted directly to the vacuum chamber and located either external and/or internal to the vacuum chamber. An embodiment of the device could include a magnet mount structure 408 connected to a pivot location 410. The pivot location may or may not traverse through the low-pressure zone of the manifold to the outer higher-pressure zone. The pivot may be in the form of a spindle that may be attached to a manual lever 412, or a gear system (worm gears, miter gears, spur gears, straight bevel gears, and variations thereof) to allow the direction or angle of spindle rotation to be changed, as well as gear ratio adjusted to allow differing force required to move the pivot and associated moving hardware. The spindle or gearing system may be coupled with an automated device such as a rotary, stepper, pneumatic, or hydraulic motor. To allow source 410 removal, the lever 412 can move the magnet series 406 away from the source 410 and return the magnet assembly following reinstallation of the source 410.

Figure 5B:
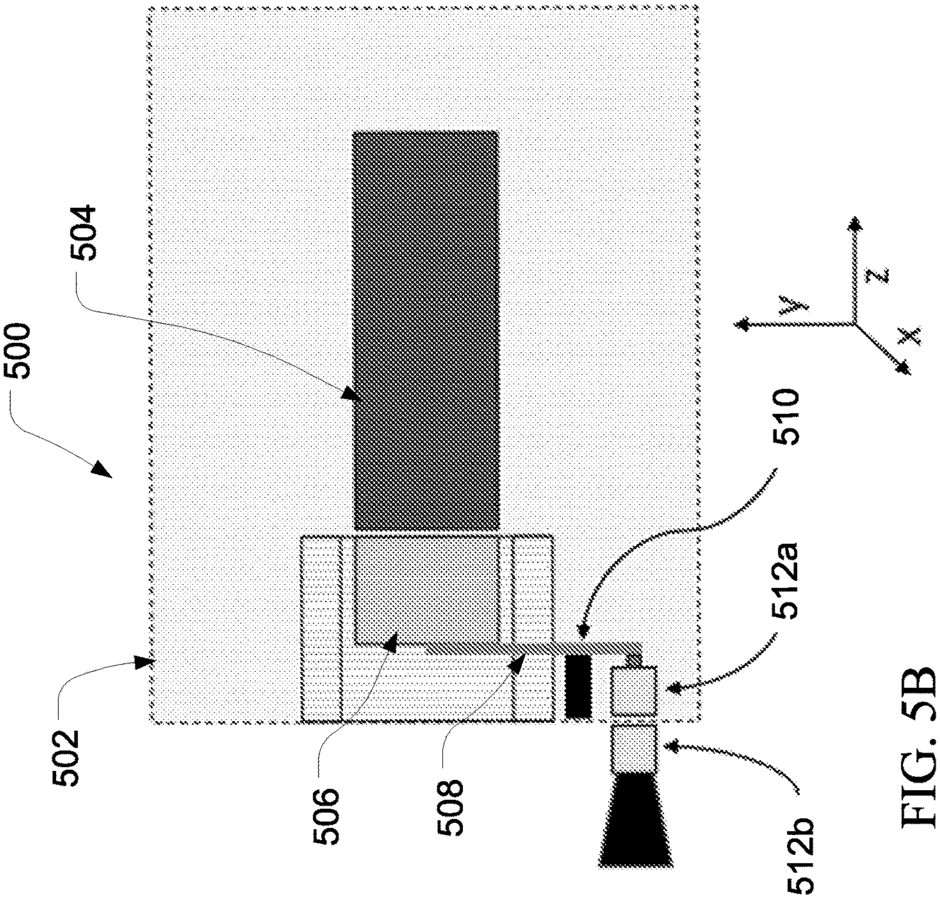
FIGS. 5A and 5B illustrate the operation of yet another exemplary magnet assembly in conjunction with the ion source, in accordance with various embodiments.
Figure 5A:
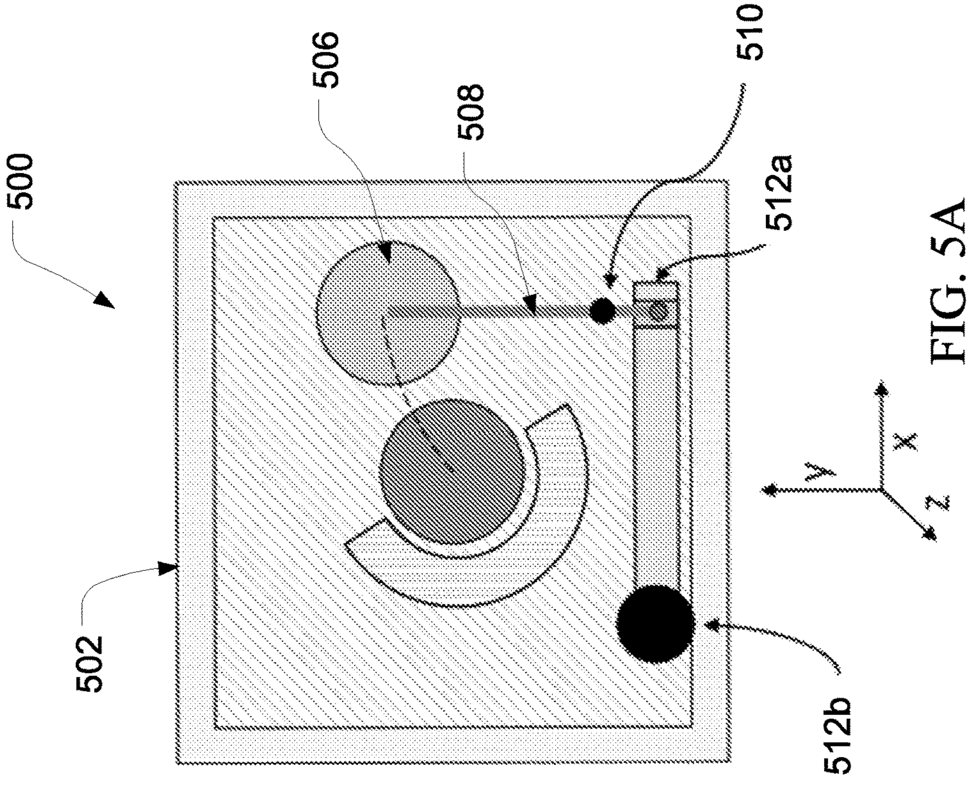

FIGS. 5A and 5B illustrate a mass spectrometer 500. The mass spectrometer 500 can include a vacuum chamber housing 502, an ion source 504, and associated hardware components. The mass spectrometer 500 may further include a magnet positioning system to mount one or more magnets or electromagnets 506. The one or more magnets or electromagnets 506 may be mounted directly to the vacuum chamber and located either external and/or internal to the vacuum chamber. Various embodiments can include a magnet mount structure 508 connected to a pivot point 510. Movement of the magnet could be coupled to a structure that is comprised of a magnetically coupler assembly 512*a* and 512*b*. When the magnetic coupler section that resides outside of the vacuum chamber 512*b* is moved, the magnetic coupler section that resides inside the vacuum chamber 512*a* moves accordingly through magnetic coupling. Magnet mount structure 508 and magnetic coupler assembly movement ratio may be adjusted by moving the pivot point 510. To allow source 504 removal, the magnetic coupler assembly 508 would move the magnet series 506 away from the source 504, and back following reinstallation of the source 504.

Figure 6B:
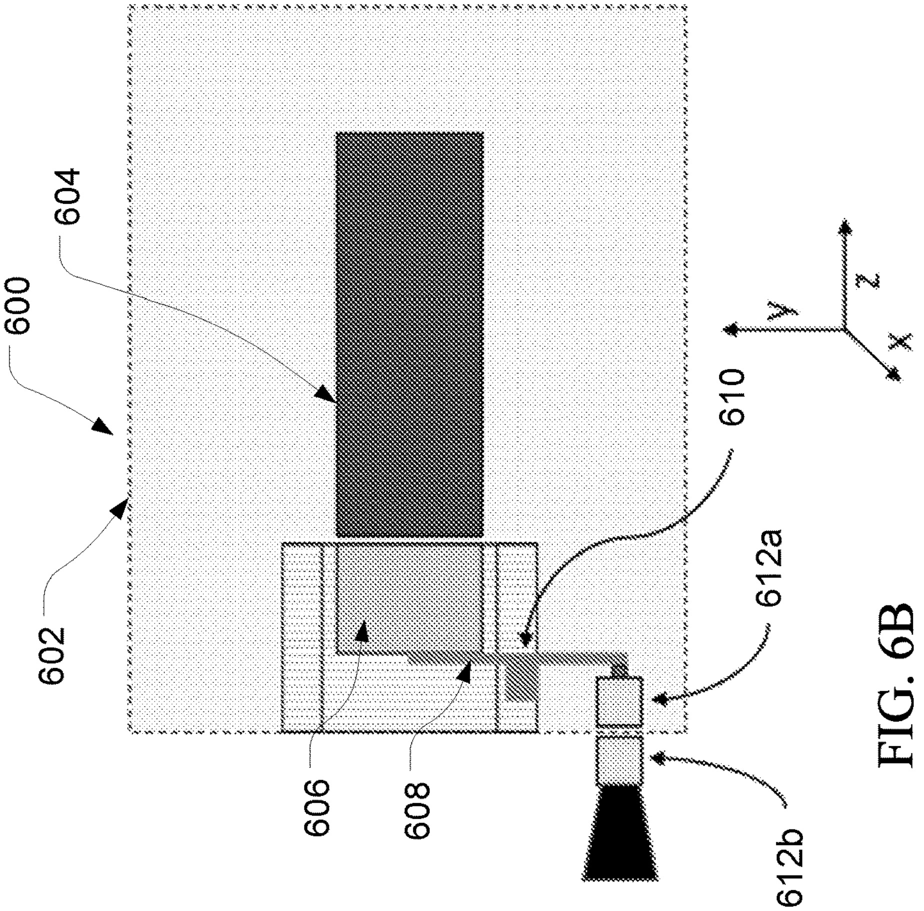
FIGS. 6A and 6B illustrate the operation of a further exemplary magnet assembly in conjunction with the ion source, in accordance with various embodiments.
Figure 6A:
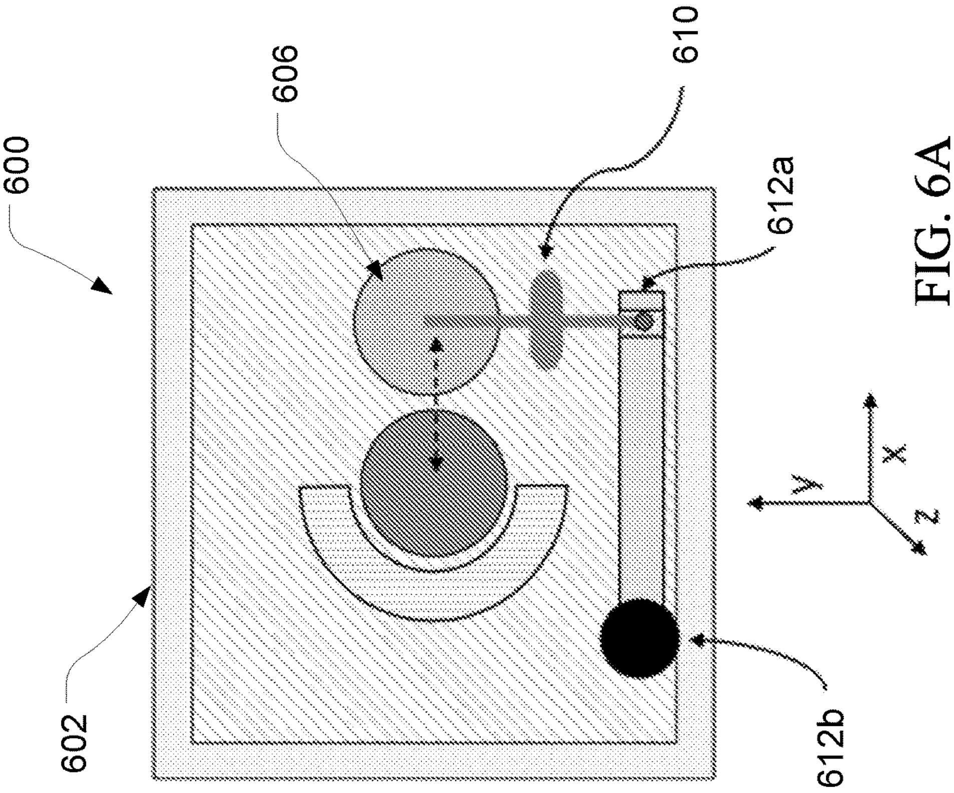

FIGS. 6A and 6B illustrate a mass spectrometer 600. The mass spectrometer 600 can include a vacuum chamber housing 602, an ion source 604, and associated hardware components. The mass spectrometer 600 may further include a magnet positioning system to mount one or more magnets or electromagnets 606. The one or more magnets or electromagnets 606 may be mounted directly to the vacuum chamber and located either external and/or internal to the vacuum chamber. Various embodiments can include a magnet mount structure 608 that slides into place. The magnet mount structure may have a feature 610 to guide the direction of sliding motion, which fits into the vacuum chamber housing by way of a slot, groove, or clearing. Movement of the structure would be provided through movement of a magnetic coupler assembly 612*a* and 612*b*. To allow source 604 removal, the magnetic coupler assembly 612*a* and 612*b* can slide the magnet series 606 away from the source 704, and back following reinstallation of the source 604.

Figure 7B:
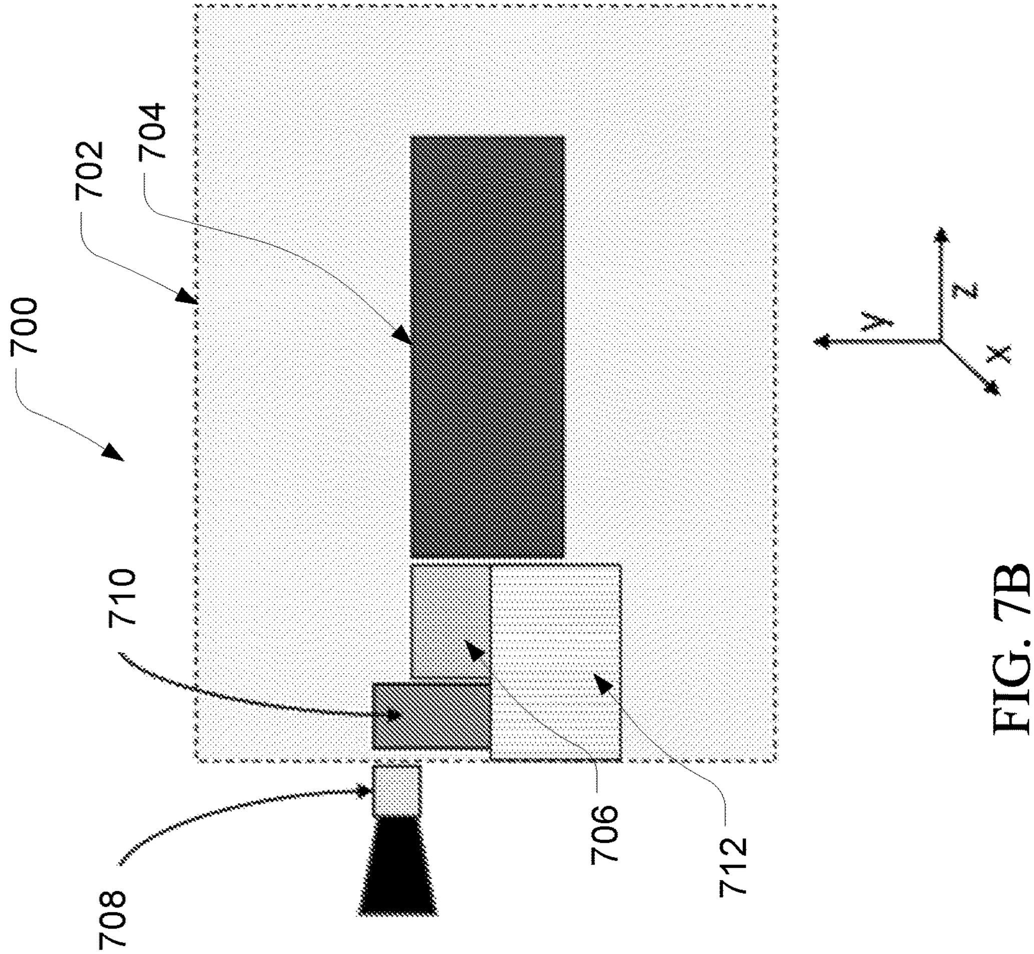
FIGS. 7A and 7B illustrate the operation of a fifth exemplary magnet assembly in conjunction with the ion source, in accordance with various embodiments.
Figure 7A:
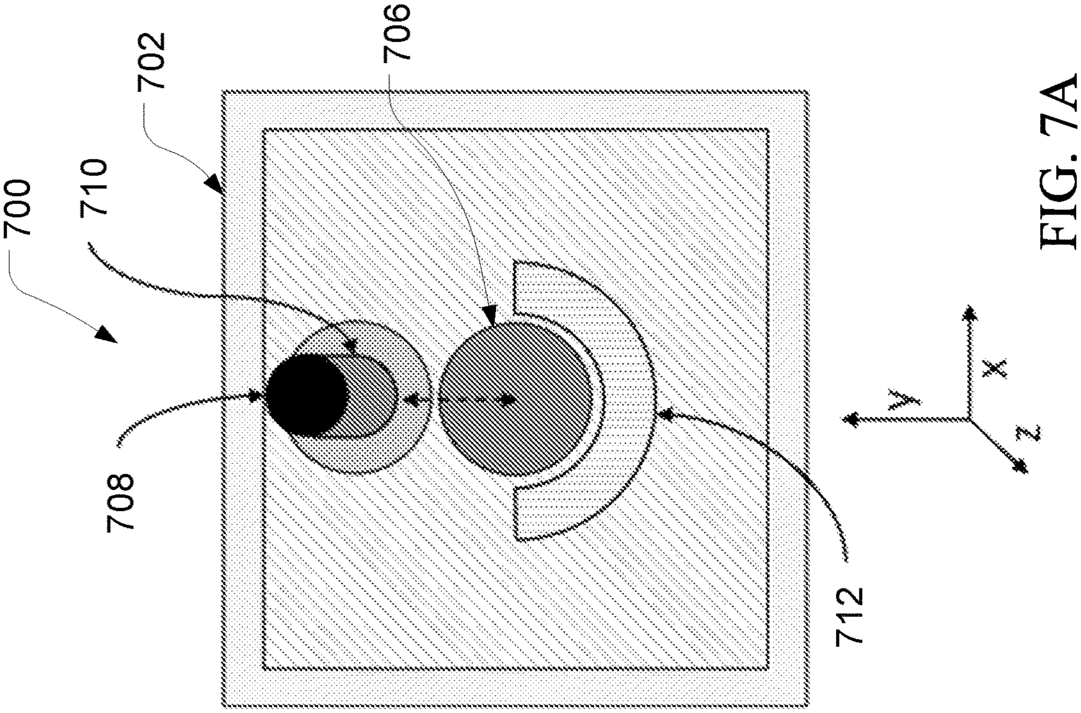

FIGS. 7A and 7B illustrate a mass spectrometer 700. The mass spectrometer 700 can include a vacuum chamber housing 702, an ion source 704, and associated hardware components. The mass spectrometer 700 may further include a magnet positioning system to mount one or more magnets or electromagnets 706. Various embodiments can comprise of a magnetic coupler 708 that could be brought up to the external face of vacuum chamber when needed and would attract a magnetic coupler 710 on the inside of the vacuum chamber, which would be connected to the source magnet series 706. Alternatively, the magnetic coupler 708 could directly attract and move the source magnet series without the need for an internal magnetic coupler 710. To allow source 704 removal, the magnetic coupler 708 can be brought to the face of the vacuum chamber 702 and move the magnet series 706 away from the source 704, and back following reinstallation of the source 704. When in position, the magnet series 706 can rest on a ledge or heatsink 712. The ledge or heatsink 712 can prevent further movement of the magnet series 706 and the magnet coupler 708 can be removed by continuing to move the coupler 708 until the magnetic attraction is weak enough to pull it away from the vacuum chamber or to its resting position.

Various embodiments of the device that utilize magnetic couplers to move the source magnet series, such as displayed in FIGS. 5A, 5B, 6A, 6B, 7A, and 7B may require tension to be placed on the magnet series in order to ensure contact with a heat sink or resting surface. This may be accomplished by building in an appropriate level of overtravel in the external magnetic coupler alignment relative to the internal magnetic coupler on the vacuum chamber. For example, in FIGS. 7A and 7B, the external magnetic coupler 708 may be positioned further down on the face of the vacuum chamber, beyond the position where the magnet series 706 would contact the ledge 712 inside the vacuum chamber. This would cause the magnetic attraction between magnetic couplers to provide constant tension on the magnet series to sit in the ledge, beyond the force of gravity.

Embodiments of the device that utilize magnetic couplers to move the source magnet series, such as displayed in FIGS. 5A, 5B, 6A, 6B, 7A, and 7B may place auxiliary magnets (as part of the magnetic coupler assembly) in proximity to the source magnet series, which may produce magnetic interference that is not ideal. To reduce this interference the auxiliary magnets could be placed in alternating magnetic pole orientations, relative to neighboring pairs of auxiliary magnet sets if multiple sets are used. In addition, ferromagnetic material such as steel or nickel coated steel may be placed on the backsides of either magnetic coupler to increase magnetic coupling field strength as well as reduce stray magnet fields, otherwise termed a magnet yoke.

Figure 8A:
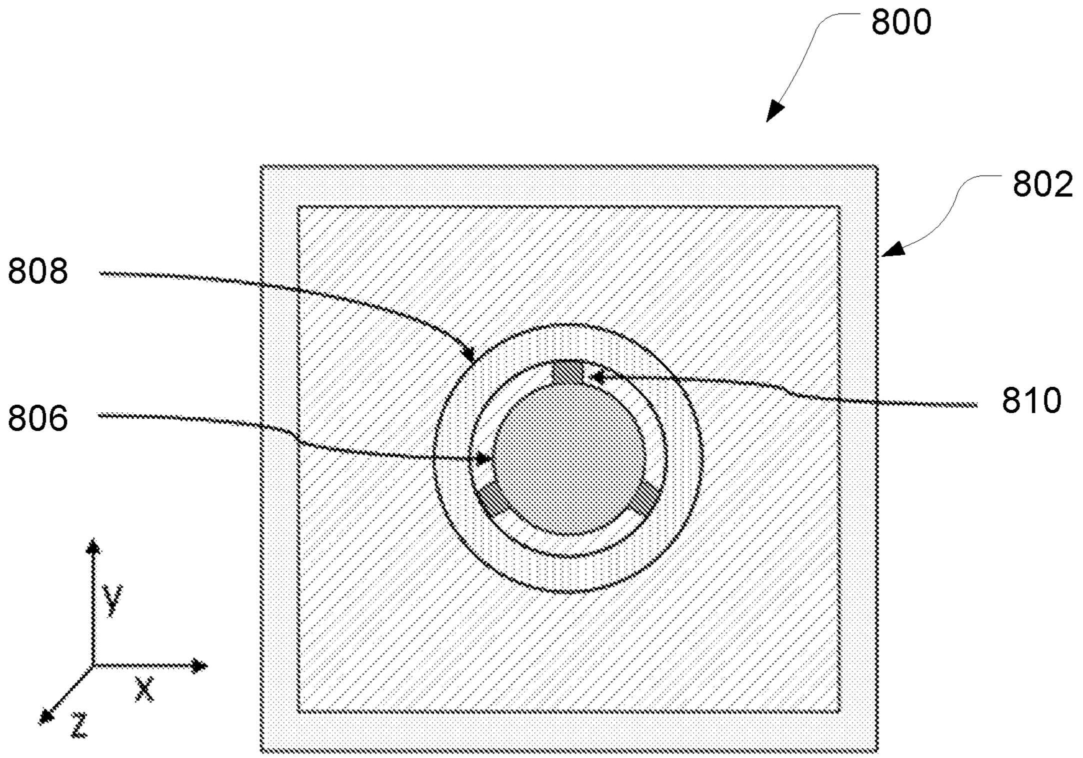
FIGS. 8A and 8B illustrate the operation of a sixth exemplary magnet assembly in conjunction with the ion source, in accordance with various embodiments.
Figure 8B:
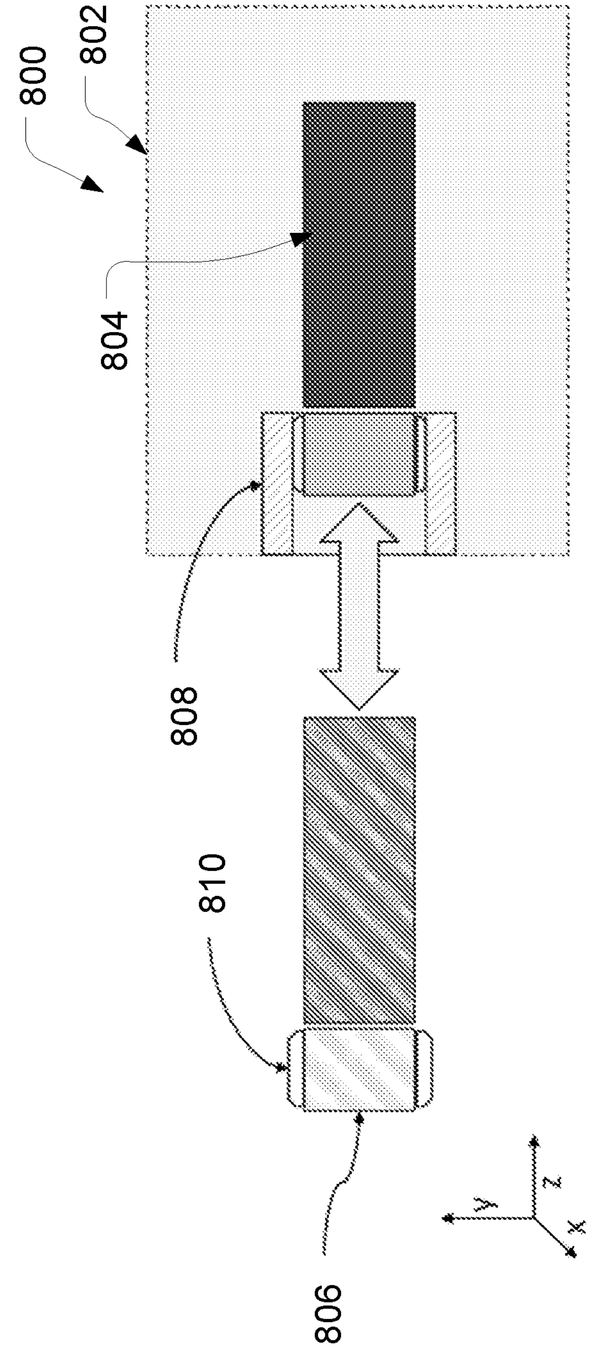

FIGS. 8A and 8B illustrate a mass spectrometer 800. The mass spectrometer 800 can include a vacuum chamber housing 802, an ion source 804, and associated hardware components. The mass spectrometer 800 may further include one or more magnets or electromagnets 806. In various embodiments, the magnet series 806 can be removed and installed into the vacuum chamber 802. A tube structure or similar mechanism 808 can be placed on the vacuum chamber to serve as a guide and heat sinking surface. Additionally, this tube structure 808 can allow passage of the magnet series 806, and optionally the source 804, through the vacuum chamber 802. The magnet series 806 would be placed in a housing or holder 810 that would have features, such as springs, that would provide positioning and heat-sinking for the magnet series 806. In various embodiments, the magnet series 806 and holder 810 can be connected to the source by a latching or hooking mechanism, and all parts could be removed or installed together through the vacuum chamber passage 808. Alternatively, the magnet series 806 and holder 810 may be separate from the source 804, either touching or non-touching, and could be removed before the source 804 and installed after the source 804.

In various embodiments, the source magnet series can be touching a surface such as a heatsink, mount, or position stop and may be supplemented by the additional force of a spring. For example, tension, torsion, compression, and spiral springs and assemblies such as an over-center spring and hinge can be employed to ensure the magnet series contacts the heatsink and/or magnet target position. Additionally, rotating or shifting components may still need mobility as well as need force to keep them in contact with other components such as the vacuum chamber door where a Belleville, disc, or wave spring may be employed. If the magnet does not have a defined stopping position or surface, such as an adjustable resting position embodiment, a spring system can be employed to provide force to retain the magnet series in a desired position and to resist movement of the magnet series from that position unless specifically desired.

In various embodiments, the magnet series can have freedom to move relative to the main axis of the source. For example, in FIGS. 7A and 7B, the magnet series ledge 712 may be non-existent allowing freedom of movement of the source magnet series in front of the source and may be positioned in an indefinite amount of locations by moving the external magnetic coupler 808 to the desired location. This could provide source magnet series position tuning ability, and therefore source tuning ability by optimizing the relative location of the magnet series to the source.

In various embodiments, the magnet series and electron source, may move together as a single assembly or coupled assemblies, but independent of other sections that make up the ion source. This would allow ion source components needing to be periodically cleaned to be removed by moving the magnet series and electron source out of the way, off axis, of ion source components being removed from the vacuum chamber.

Figure 9:
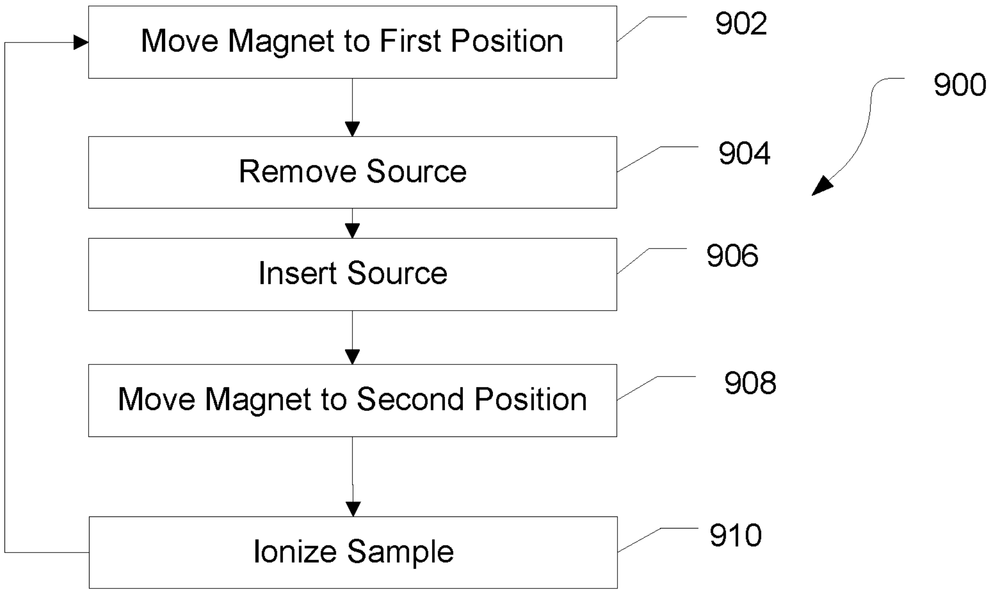
FIG. 9 illustrates an exemplary method of replacing an ion source, in accordance with various embodiments.

FIG. 9 illustrates a method 900 of replacing an ion source. At 902, the magnet assembly is moved to a first position. In the first position, the magnet assembly can be positioned to not obstruct the removal of the ion source. In various embodiments, the first position can locate the magnet assembly to the side, above, or below an opening for removal of the ion source. At 904, the ion source can be removed. In various embodiments, the ion source can be removed through the opening once the magnet assembly is positioned so as to not obstruct the opening. In various embodiments, the ion source opening can be isolated from the rest of the vacuum chamber to prevent venting of the vacuum chamber and to reduce the time needed to reestablish the vacuum pressures needed for operation of the mass spectrometer.

At 906, the ion source can be inserted through the opening. In various embodiments, a new ion source can be inserted. Alternatively, the same ion source can be reinserted after maintenance, such as cleaning and/or replacement of an electron source filament. At 908, the magnet assembly can be moved to a second position. The second position of the magnet assembly can align the magnet with an electron source of the ion source. The second position can be selected to optimize operation of the ion source, such as to maximize ionization or intensity of the ion beam. The electron source can produce electrons that cause the ionization a sample, as indicated at 910. Ionizing the sample can include direct ionization by the electrons, such as EI, or indirect ionization where a reagent is ionized and reacts with the sample, such as CI. The ionized sample can be analyzed by mass spectrometry to identify and quantify compounds in the sample.

Figure 10:
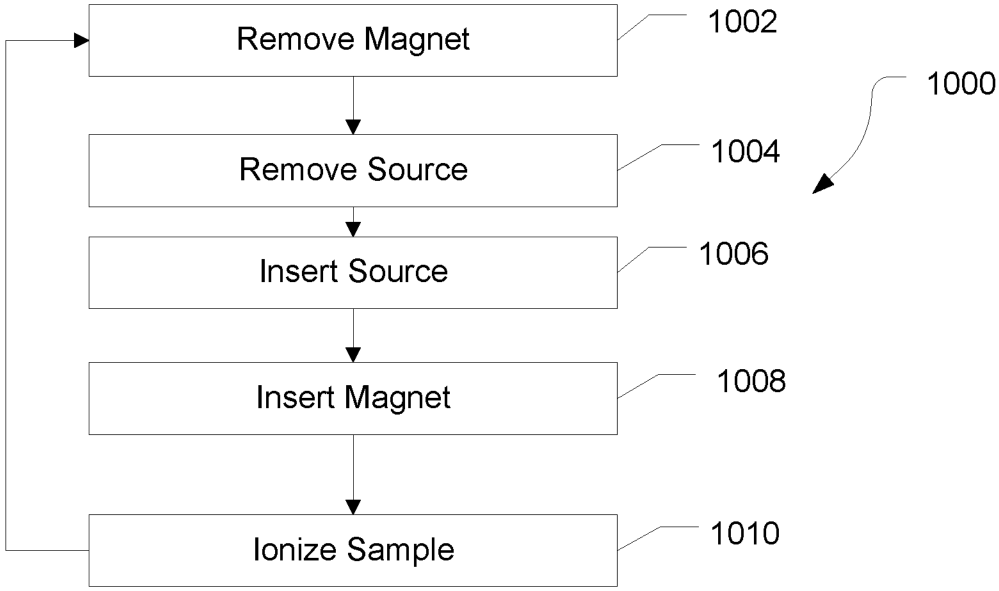
FIG. 10 illustrates another exemplary method of replacing the ion source, in accordance with various embodiments.

FIG. 10 illustrates a method of removing of an ion source. At 1002, a magnet assembly can be removed from a mass spectrometer. In various embodiments, the magnet assembly can be removed through an opening. At 1004, an ion source can be removed. In various embodiments, the ion source can be removed through the same opening once the magnet assembly is removed so as to not obstruct the opening. The ion source and the magnet assembly can be coupled and removed at the same time. Alternatively, the ion source and magnet assembly may not be coupled and thus are removed sequentially. In some embodiments, the electron source can be coupled to the magnet assembly and may not be coupled to the ion source. Alternatively, the electron source can be coupled to the ion source and may not be coupled to the magnet assembly. In various embodiments, the magnet assembly and the ion source can be isolated from the rest of the vacuum chamber to prevent venting of the vacuum chamber and to reduce the time needed to reestablish the vacuum pressures needed for operation of the mass spectrometer.

At 1006, the ion source can be inserted through the opening. In various embodiments, a new ion source can be inserted. Alternatively, the same ion source can be reinserted after maintenance, such as cleaning and/or replacement of an electron source filament. At 1008, the magnet assembly can be inserted through the opening. If the ion source and the magnet assembly are coupled, the ion source and the magnet assembly can be inserted simultaneously, such as 1006 and 1008 are performed as one step. Alternatively, if the ion source and the magnet assembly are not coupled, the ion source and the magnet assembly can be inserted sequentially, such as 1006 is performed before 1008. In some embodiments, the electron source can be coupled to the magnet assembly and may not be coupled to the ion source. Alternatively, the electron source can be coupled to the ion source and may not be coupled to the magnet assembly. At 1010, the sample can be ionized. Ionizing the sample can include direct ionization by the electrons, such as EI, or indirect ionization where a reagent is ionized and reacts with the sample, such as CI. The ionized sample can be analyzed by mass spectrometry to identify and quantify compounds in the sample.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A mass spectrometer comprising:

a removable ionization assembly including an ionization chamber and at least one ion lens, the removable ionization assembly having a primary axis defined by the direction of an ion beam exiting the ionization assembly, the ionization chamber and the at least one ion lens arranged along the primary axis;

an electron source aligned along the primary axis of the ionization assembly and configured to provide an electron beam parallel to the primary axis; and a magnet assembly including a magnet; the magnet assembly movable between a first position in which the magnet is positioned to allow removal of the ionization assembly from an ion source and a second position in which the magnet is aligned with the electron source, wherein the magnet assembly, ionization assembly, and the electron source are within a vacuum chamber, and movement of the magnet assembly is controlled by a component arranged outside the vacuum chamber and magnetically coupled to the magnet assembly.

2. The mass spectrometer of claim 1, wherein the magnet assembly includes a second magnet.

3. The mass spectrometer of claim 1 wherein the magnet is an electromagnet.

4. The mass spectrometer of claim 1, wherein the magnet assembly is thermally coupled to a portion of the vacuum chamber, the portion of the vacuum chamber acting as a heat sink.

5. The mass spectrometer of claim 1, wherein the electron source includes a thermionic filament.

6. The mass spectrometer of claim 1, wherein the electron source includes a field emitter.

7. The mass spectrometer of claim 1, wherein the magnet assembly rotates around a pivot point between the first position and the second position.

8. The mass spectrometer of claim 1, wherein the magnet assembly slidably translates between the first position and the second position.

9. The mass spectrometer of claim 1, further comprising a motor to move the magnet assembly between the first position and the second position.

10. A method of removing an ionization assembly from an ion source, comprising:

moving a magnet assembly including a magnet from a first position in which the magnet is aligned with an electron source to a second position in which the magnet does not obstruct removal of the ionization assembly, the ionization assembly having a primary axis defined by the direction of an ion beam exiting the ionization assembly, the ionization chamber and at least one ion lens arranged along the primary axis, the electron source aligned along the primary axis of the ionization assembly and configured to provide an electron beam parallel to the primary axis; and removing the ionization assembly from the ion source, wherein moving the magnet assembly from the first position to the second position includes moving a component outside of a vacuum chamber that is magnetically coupled to the magnet assembly while the magnet assembly, the ionization assembly, and the electron source are within the vacuum chamber.

11. The method of claim 10, further comprising inserting the ionization assembly or a replacement ionization assembly into the ion source; and moving the magnet assembly from the second position to the first position.

12. The method of claim 10, further comprising using the electron source to ionize a sample when the magnet is in the first position.

13. The method of claim 10, wherein the magnet assembly includes a second magnet.

14. The method of claim 10, wherein the magnet is an electromagnet.

15. The method of claim 10, wherein the magnet assembly is thermally coupled to a portion of the vacuum chamber, the portion of the vacuum chamber acting as a heat sink.

16. The method of claim 10, wherein the electron source includes a thermionic filament.

17. The method of claim 10, wherein the electron source includes a field emitter.

18. The method of claim 10, wherein moving the magnet assembly from the first position to the second position includes rotating the magnet assembly around a pivot point.

19. The method of claim 10, wherein moving the magnet assembly from the first position to the second position includes slidably translating the magnet assembly.

20. The method of claim 10, wherein moving the magnet assembly from the first position to the second position including activating a motor to move the magnet assembly from the first position to the second position.

* * * * *